No. 633,282. Patented Sept. 19, 1899.
H. C. CLAY.
TRACTION WHEEL.
(Application filed Apr. 14, 1899.)
(No Model.)
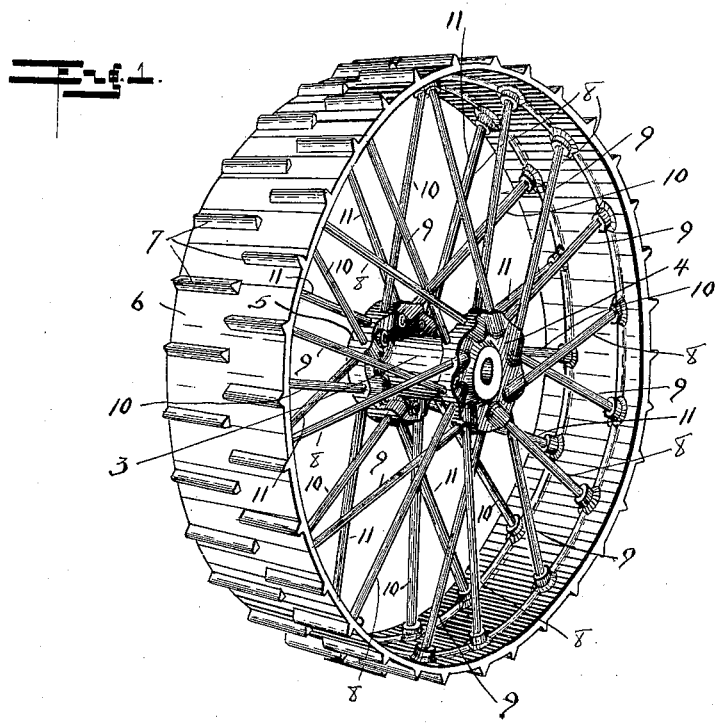
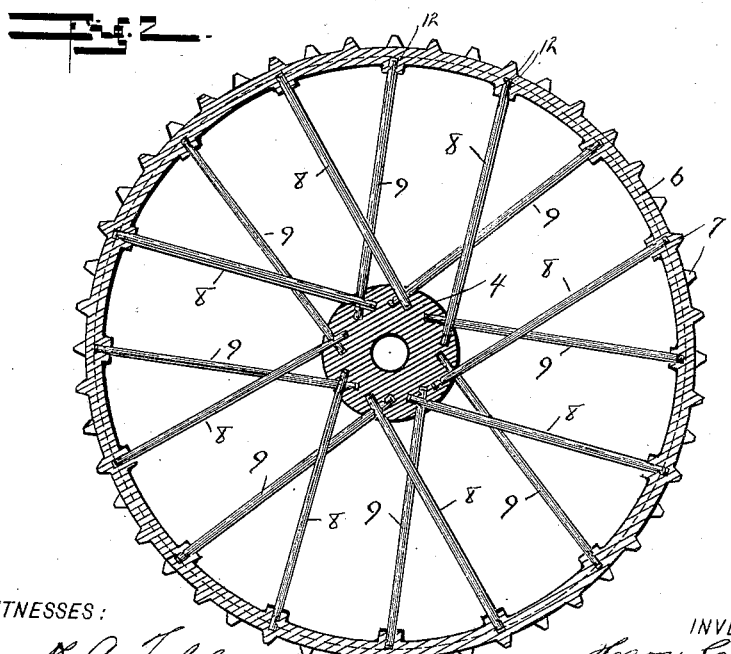
WITNESSES:
Frank A. Fable
Charles B. McDowell
INVENTOR
Harry C. Clay.
BY
Arthur M. Hood
ATTORNEY.

UNITED STATES PATENT OFFICE.

HARRY C. CLAY, OF COLUMBUS, INDIANA, ASSIGNOR TO THE REEVES & COMPANY, OF SAME PLACE.

TRACTION-WHEEL.

SPECIFICATION forming part of Letters Patent No. 633,282, dated September 19, 1899.

Application filed April 14, 1899. Serial No. 712,970. (No model.)

*To all whom it may concern:*

Be it known that I, HARRY C. CLAY, a citizen of the United States, residing at Columbus, in the county of Bartholomew and State of Indiana, have invented a new and useful Drive-Wheel for Traction-Engines, of which the following is a specification.

My invention relates to an improvement in drive-wheels, more particularly to drive-wheels for traction-engines.

The object of my invention is to produce a wheel of light but substantial structure to which power may be applied in either angular direction at or near its center, which power will be transmitted to the rim without strain.

The accompanying drawings illustrate my invention.

Figure 1 is a perspective view thereof. Fig. 2 is a vertical section through one of the spoke-flanges.

In the drawings, 3 indicates a hub having two circumferential flanges 4 and 5, one near each end, and 6 indicates a suitable rim the outer face of which may be provided with the usual ribs 7.

Four series of spokes 8, 9, 10, and 11 are provided, said spokes being preferably of wrought metal, while the hub and rim are of cast metal, the spokes being cast into the hub and rim. The inner ends of spokes 8 and 9 are secured or cast into the flange 4, while the outer ends are secured or cast into the rim 6, the fastening means being such that each spoke may be subjected alternately to tension and compression. The spokes 8 and 9 are arranged at their outer ends in one circumferential line. At their inner ends, however, the spokes of both series are arranged tangentially to the axis, spokes 8 lying in one angular direction and spokes 9 in the opposite angular direction, and spokes 8 lying along one circumferential line, while spokes 9 lie along a different line. By this arrangement the inner ends of adjacent spokes of the two series may be crossed. Spokes 10 and 11 are secured to the rim 6 and flange 5 in a similar manner.

In order that the spokes may serve both as ties and struts, any suitable connecting means may be shown.

In the drawings each spoke is provided at each end with one or more indentations 12, into which the metal of the rim or hub may enter.

In operation, suppose a clockwise stress be applied to the hub of the wheel shown in Fig. 2. All of the spokes 8 will act as ties under tension, while all of the spokes 9 will act as struts under compression. If a counter clockwise stress be applied to the hub, the action will be reversed and spokes 8 put under compression and spokes 9 under tension. A twisting driving stress in either direction is therefore transmitted by both series of spokes.

A wheel made in this manner may be light, but nevertheless will be extremely rigid.

It will be readily understood that for narrow wheels one hub-flange and but two series of spokes will be sufficient.

I claim as my invention—

1. In a wheel, a hub having a pair of flanges, two series of crossing tangential straight spokes having their inner ends staggered and secured to one of said flanges and their outer ends to the rim, and two other series of crossing tangential spokes having their inner ends staggered and secured to the other of said flanges and their outer ends to the rim, all of the said spokes being secured to the hub and rim so as to act both as struts and ties.

2. In a wheel, a rim, and a hub having a pair of flanges, two series of crossing tangential straight spokes at their outer ends cast into the rim along one circumferential line and, at their inner ends, staggered and cast into one of said flanges, and two other series of crossing tangential spokes at their outer ends cast into the rim along one circumferential line and, at their inner ends, staggered and cast into the other of said flanges.

HARRY C. CLAY.

Witnesses:
HARRY G. SCHOWE,
EDGAR JEWELL.